Dec. 19, 1933.　　　T. W. PAUL　　　1,939,830
HITCH CONNECTION
Filed July 6, 1931　　　2 Sheets-Sheet 2
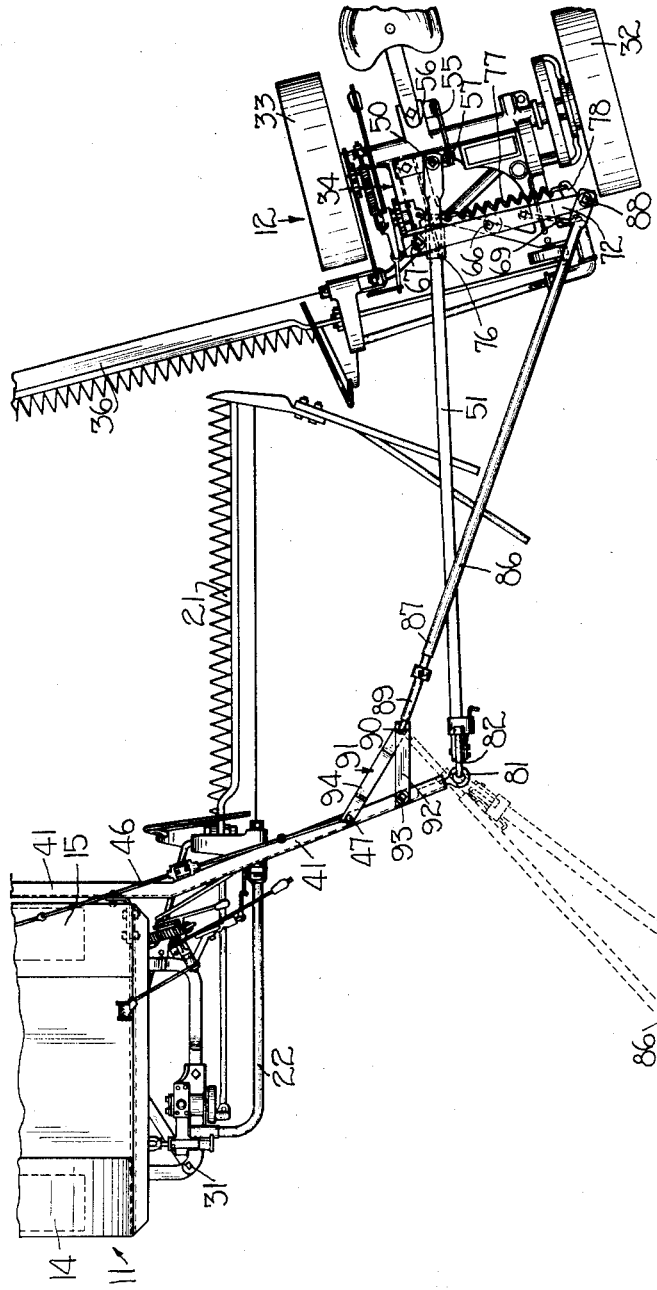
FIG-3
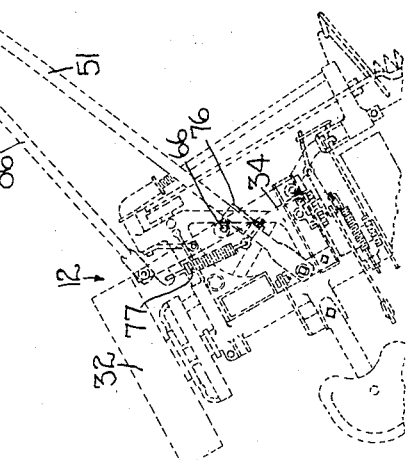
INVENTOR
Talbert W. Paul
BY Brown, Jackson
Boettcher & Dienner
ATTORNEYS.
WITNESS
Walter Ackerman Patented Dec. 19, 1933

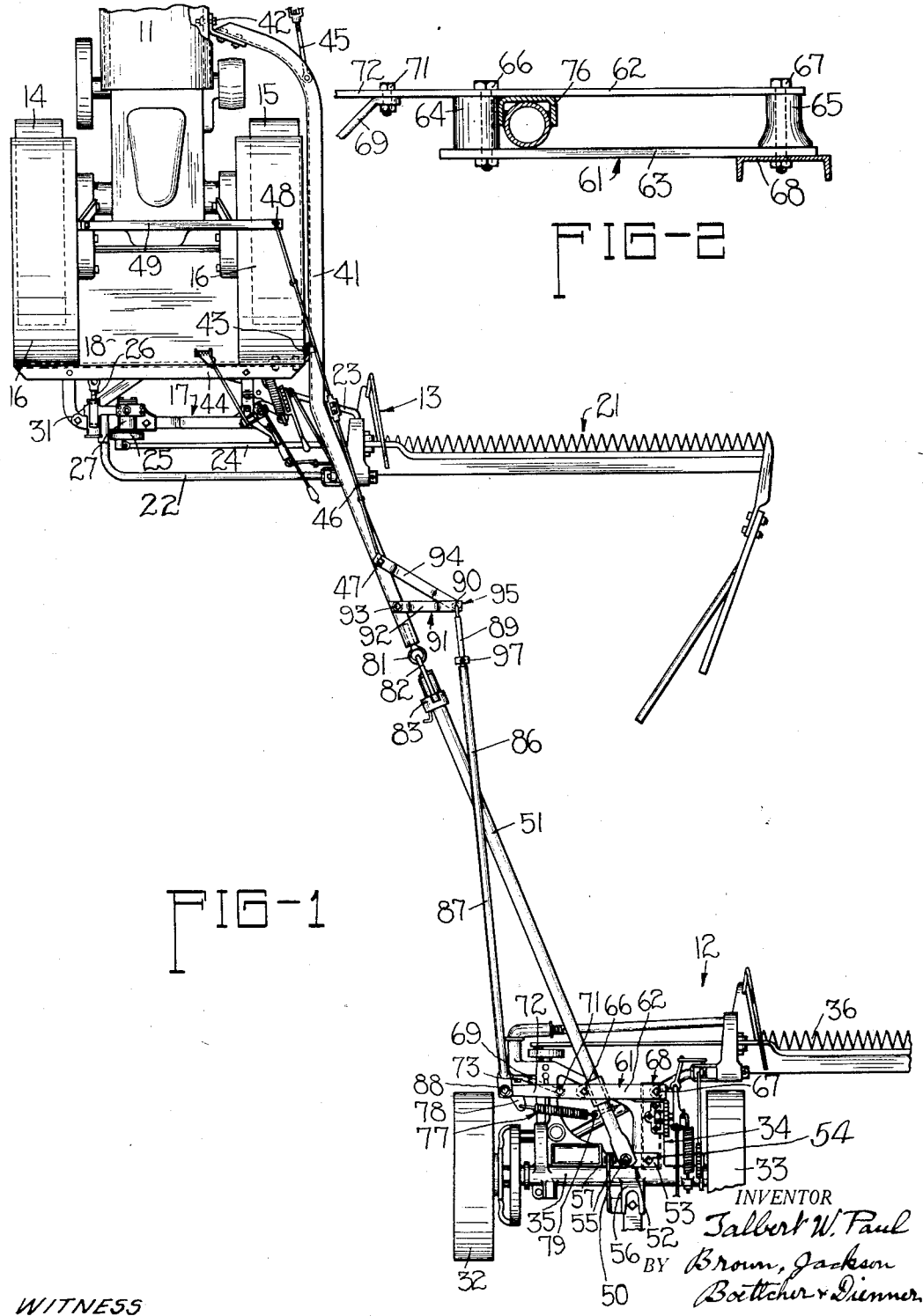
Dec. 19, 1933.  T. W. PAUL  1,939,830
HITCH CONNECTION
Filed July 6, 1931   2 Sheets-Sheet 1

1,939,830

UNITED STATES PATENT OFFICE 1,939,830

HITCH CONNECTION

Talbert W. Paul, Moline, Ill., assignor to Deere & Company, Moline, Ill., a corporation of Illinois Application July 6, 1931. Serial No. 548,721

10 Claims. (Cl. 280—33.44)

My invention relates to hitch connections of the type employed for drawing a trailing implement behind a pulling vehicle. The invention is more particularly concerned with an improved arrangement for associating and positively controlling the working implement in an offset relation to the pulling vehicle.

My invention is particularly adapted for use in connection with a combined "tractor mower" and a separate mowing machine. The combined "tractor mower" cuts one swath, and the separate mowing machine is operatively associated with the tractor so as to cut an additional swath adjoining the swath previously cut by the "tractor mower", thereby doubling the work accomplished. While this is the preferred use of my invention, it will be understood that, within its broader aspects, the invention is also adaptable to the operation of other implements, which may include corn harvesters, reapers and possibly grain combines.

The principal object of my invention is the provision of an improved hitch connection for the above implements that will not only draw the trailing implement in correct relation on straight forward movement but will also turn the trailing implement through the proper movement and angle when turning either to the right or left.

In operating two implements such as a "tractor mower" and a mowing machine it is particularly desirable to turn as squarely as possible at the end of the field and at the same time to complete the cutting of two full swathes so that the work will be uniform and no grain will be left standing on such turns due to its having passed between the cutter bars. In the usual turn at the corner of a field the cutter bars of the mowers are on the inner side of the turn, and it is a specific object of the present invention to provide hitch means which in turning will cause the cutter bar of the trailing mower to execute a full turning movement and to then fall in behind the cutter bar of the front implement in proper offset relation thereto for continuing along the other side of the field.

Another object is to provide hitch means of the above general description in which a draft member is provided for the trailing implement which can swing relatively to said implement but which is also operative to exert a steering control thereon by a lateral force set up in said draft member.

Other objects and advantages of my invention will become apparent to one skilled in the art from the following description of my invention, taken in conjunction with the accompanying drawings, in which:

Figure 1 is a fragmentary plan view of a mowing machine offset in the rear of the tractor mower as they would appear in straight forward movement when using the present hitch connection;

Figure 2 is an enlarged elevational view of the supporting frame guides and end stops on the mowing machine with which one end of the hitch connection is associated; and Figure 3 is a fragmentary plan view showing in full lines the position of the mowing machine and tractor mower intermediate a right turning movement; and in dotted lines showing the position of the mowing machine and tractor intermediate a left turning movement.

Referring more particularly to Figure 1 of the drawings, a tractor, indicated generally at 11, is adapted to pull a mowing machine 12. The tractor may be of any conventional type but preferably is provided with a mowing unit 13 mounted on the rear thereof, and accordingly I shall refer to this unit as a "tractor mower". The tractor has rear traction wheels 14 and 15 which are shown in dotted lines beneath fenders 16. A U-shaped supporting frame, indicated at 17, is mounted beneath a rear platform 18 and is connected to the tractor frame (not shown). A cutter bar 21 extends laterally from the rear of the tractor and is operatively secured to the supporting frame 17 by drag bar 22 and tension bar 23. A pitman rod 24, journaled on a crank arm of the flywheel 25, actuates a cutting mechanism on the cutter bar 21. A power take-off shaft 26 from the tractor motor transmits power to the flywheel 25 through the transmission mechanism 27. In the present embodiment, the whole mower unit 13 is adapted to pivot about a point 31 on the U-shaped supporting frame 17 when the cutter bar 21 encounters any unusual obstruction. For a detailed description of this construction, reference may be had to my prior Patent, No. 1,915,548, issued June 27, 1933.

The mowing machine 12 may be of any conventional type similar to the well known horse drawn implement, the embodiment illustrated comprising a main frame 34 formed integral with a transverse axle 35. A pair of supporting wheels 32 and 33 are mounted on either end of the axle 35, and the wheel 32 also furnishes power for a cutter mechanism on the cutter bar 36 by means of a suitable crank and pitman connection.

For transmitting draft to the rear mower 12 and to position the latter in offset relation to the tractor, a draft frame 41 is provided along the right side of the tractor, the forward end of which is curved inwardly and bolted, at 42, to the side of the tractor frame. An intermediate portion of the frame 41 extends longitudinally alongside of the traction wheel 15 and is secured at 43 to the innerside of the right fender 16 and brace member 44. The rear end of the frame 41 angles rearwardly away from the side of the tractor. The frame 41 is shown as braced by rods 45 and 46, the rod 45 being secured to the curved portion of the frame and to a point (not shown) at the front of the tractor. The brace rod 46 is secured by a bolt 47 near the rear end of the frame 41 and to a point 48 on the right fender 16. A strap 49 is connected across the tractor to the left fender 16 and further braces the connection 48 to which the forward end of the rod 46 is attached.

The trailing mower 12 is provided with a tubular draft tongue 51, the forward end of which is connected to the rear end of the draw frame 41, as will presently appear. The rear end of the tongue 51 is flattened and pivotally secured at 50 on a bracket 52 carried by the trailing mower. The bracket 52 consists of a horizontal strap 53 which is bolted at one end 54 to the frame 34, and a vertical strap 55 which is bolted below a seat support bracket 56. The ends of the straps 53 and 55 are bolted together as at 57 and form a rigid support for the tongue. It is obvious that the bracket structure 52 might be an integral part or extension of the frame 34 is found convenient.

The draft tongue 51 extends through a guide frame 61 which holds the tongue substantially rigidly against vertical movement and provides a maximum limitation on the lateral pivoting movement of said tongue on the mower. As best seen in Figure 2, the guide frame 61 comprises two vertically spaced horizontal bars 62 and 63 which are mounted transversely of the mower frame 34. The bars 62 and 63 are held apart by two spacers or stops in the form of sleeves 64 and 65. Bolts 66 and 67 pass through the bars 62 and 63 and spacers 64 and 65 to secure the bars in position. The guide frame 61 as a whole is supported on the mower by the bracket 68 and the brace 69. The bolt 67 passes through the guide frame 61 and supporting bracket or channel iron 68 to secure one end of the guide frame to the mower while the brace rod 69 is bolted at 71 to the extension 72, and at 73 to the mower frame.

To facilitate sliding movement of the tongue 51 and to prevent the same from rotating about its axis between the horizontal bars 62 and 63 of the guide frame, a square cap 76 is welded or otherwise secured to the tongue, and this cap has a sliding engagement with the top bar 62. The sides of the cap 76 protect the draft tongue as the latter abuts against the stops 64 and 65 in turning to the left or sharply to the right, respectively, which stops limit the horizontal pivoting movement of the draft tongue 51 about the pivotal point 50.

The stops 64 and 65 are preferably eccentrically mounted on their respective bolts 66 and 67 so as to be adjustable to shift the effective positions of the stops to thereby alter the position which the rear mower will assume under certain operating conditions. That is, by turning the stop 64 on the bolt 66, the maximum left hand position which the draft tongue 51 can assume will be changed. Should the cutter bar on the rear mower not be exactly perpendicular to the line of advance, the eccentric stop 64 can be adjusted to correct the position of the tongue when abutting the stop. If desired the right hand eccentric stop 65 may also be made adjustable to alter the position that the tongue will assume when it abuts this stop in a turning operation.

When the mower 12 is drawn forwardly the draft tongue 51 will extend diagonally to the left and abut the stop 64, as shown in Figures 1 and 2. This action takes place because of the manner in which the pivot 50 is located with reference to the center of load of the mower 12. The clockwise turning movement of the mower 12 about the pivot 50 due to the drag of the cutter bar and the load thereon is greater than the counterclockwise tendency of movement created by the tractive power being derived from the left hand ground wheel 32. That is, the pivot 50 on the mower 12 is spaced to the left of the center of load of the implement so that the latter will normally tend to turn or pivot to the right in forward movement, but being restrained from such movement by the stop 64 engaging the tongue 51. To increase this clockwise turning moment, a spring 77 is provided between the mower and the tongue 51, the spring being connected to an eye bolt 79 on the draft tongue and to a lug 78 on the extension 72 of the top bar 62. This spring 77 tends to yieldingly hold the stop and tongue together. Should the mower 12 tend to pivot counterclockwise about the pivot 50, as would occur for instance if the traction wheel 32 should strike a stump or rut, the spring 77 would then resist this otherwise increased counterclockwise moment sufficiently to hold the mower in line behind the tractor.

As before mentioned, draft is transmitted from the tractor to the mower through the draft tongue 51 being connected to the rear end of the draw frame 41. This connection preferably comprises an eye or ring member 81 fixed to the frame 41, and this eye or ring member 41 receives a releasable clevis 82 of a safety release mechanism 83. If the cutter bar 36 should encounter a sufficient obstruction, such as a stump or rock, or if an abnormal load is transmitted through the tongue 51, the clevis 82 will trip to become released from the ring or eye 81 and instantly interrupt the transmission of draft to the mower 12. For a detailed description of this safety release mechanism, reference may be had to my copending application, Serial No. 550,411, filed July 13, 1931.

When the tractor 11 is traveling in a straight line, or turning to the left, the draft tongue 51 alone guides the mower 12 by reason of the greater clockwise turning moment of the mower about the pivot 50. When the tractor is turned or pivoted to the right, the draft tongue 51, being in engagement with the stop 64, will transmit some turning movement to the mower to steer the latter to the left due to the fact that the pivotal connection 81—82 of the tongue is spaced in the rear of the traction wheel 15 of the tractor, wherefore this pivotal point swings to the left when the tractor turns to the right.

To supplement the action of the tongue 51 in this left turning movement of the mower and to effect a complete pivoting movement of the mower in this direction of turn, a guide or steering member 86 is employed between the mower and the tractor. The guide member 86 comprises a tubular shaft 87 having its rear end pivoted at 88 on the extended end 72 of the top guide bar 62, and the forward end of this shaft is adapted to receive a rod 89 for telescopic movement therein. The rod 89 has a downwardly bent or hooked end portion 90 which is pivotally received in a lateral bracket 91 adjacent to the end of the draw frame 41. The bracket 91 preferably comprises a transverse bar 92, bolted at 93 on the frame 41, and a brace 94 secured to the bar 92, as at 95, and to the frame 41 by the bolt 47. The hooked end 90 of the rod is prevented from being accidentally removed from the bracket 91 by a cotter key (not shown) passing through the hook beneath the bracket 91. The rod 89 carries an adjustable stop 97 to limit the inward movement of the rod 89 in the tubular shaft 87, this stop preferably comprising a metal sleeve mounted so as to have longitudinal adjustment on the rod 89. This adjustable stop 97 is ordinarily so positioned on the rod 89 that it is spaced a short distance from the end of the shaft 87 when the mowers are being operated in a straight line. The pivot point 90 on the bracket 91 is so related to the hitch point 81 that, upon the tractor 11 turning to the right, the rod 89 will move into the tubular shaft 87 until the stop abuts the end of the shaft 87 and thereafter the shaft 87 and rod 89 will transmit a rearward thrust or force to the extension 72. This rearward force exerted by the shaft 87 and rod 89 on the extension 72 at a point considerably to the left of the load center of the mower will overcome the clockwise moment about the pivot 50 to swing the mower sharply to the left. In this manner the cutter bar 36 will swing sharply to the left to complete its swath or cut the crop between the cutter bars before the rear cutter bar is deflected to the right in completing the turn, with the result that both swathes will be properly cut and no grain will be left standing due to having been missed between the cutter bars.

In the preferred manner of using the present hitch connection, when the tractor reaches the end of the field at a point bringing its rear traction wheel 15 approximately at the corner of the crop or previously cut swathes, the tractor is turned sharply to the right, endeavoring to have it pivot substantially on this inner rear wheel 15. In so turning, the front cutter bar 21, being mounted on the rear portion of the tractor 11 and extending laterally therefrom, will move in a rearwardly pivoting arc about the traction wheel 15 as an axis. Thus, the path of movement of the cutter bar 21 will be towards the left and back out of the swath already cut in its forward advance. The rear mower 12 will first turn to the left, due to the point of connection 81—82 of the draft tongue 51 being spaced offset and to the rear of the tractor, and due to the pivoting of the tractor about the traction wheel 15 as an axis. In this initial movement of the mower, a lateral stress or bending force will be exerted in the draft tongue due to the latter abutting the stop 64 and due to the sharp shifting of the pivoting connection 81—82 to the left. Shortly after the turning of the tractor, the rod 89 will move longitudinally into the tubular rod 87 until the stop 97 contacts the end of the rod 87, and thereupon a compression force will be transmitted through the guide member 86 to exert a direct or rearward thrust on the extension 72. This rearward force or thrust on the extension 72 will tend to make the mower pivot in a counterclockwise direction to supplement the left turning movement of the mower 12 caused by the pulling and bending forces exerted by the tongue 51, thereby causing the mower 12 to turn sharply to the left until the tractor 12 has stopped its pivoting movement and assumed a position at right angles to its previous direction of movement.

By now driving the tractor forwardly in a direction to cut a new swath, the tongue 51 will leave the stop 64 of the guide frame and move laterally against the tension of the spring 77 towards the opposite stop 65. The tension of the spring 77 or the contacting of the tongue 51 with said opposite stop 65 will then cause the rear mower to pivot clockwise to the right. The rod 89 will also be drawn somewhat from the tubular shaft 87 causing the stop 97 to move away from the end of the shaft 87. Continued forward movement of the tractor will cause the rear mower to pivot about a point between or adjacent its two wheels and to swing the cutter bar 36 rearwardly out of the path of the forwardly moving cutter bar 21. Thereafter with continued forward movement of the tractor the rear mower will continue to swing to the right, aided by the spring 77, and finally the rear mower will fall in behind the front mower in proper offset relation thereto and will move forwardly with the tractor.

Figure 3 illustrates the position that the rear mower 12 will assume relative to the tractor at one point in a right turning movement. The solid lines in this figure show draft tongue 51 contacting the right hand stop 65 in the guide frame, and the cutter bar 36 receding from the path of the forwardly moving cutter bar 21.

Summarizing the action of the draft tongue 51 and the guide member 86 in a right turning movement, it will be seen that the draft tongue 51 will initially be subjected to left bending stresses, while at the same time the guide member 86 will be subjected to compression forces. When the tractor has completed its right turning movement, the tongue 51 will move laterally to the right to abut the right hand stop 65 in the guide frame and the compression forces on the guide member 86 will cease by the outward longitudinal movement of the rod 89 in the shaft 87. Forward movement of the tractor will then cause right bending stresses on the tongue 51 which stresses continue until the mower 12 has pivoted to a point where the tongue will leave the stop 65 and move laterally to its normal position against the left hand stop 64, whereby the mower 12 will assume its normal position offset in the rear of the tractor mower. It will be noted that the turning movements of both cutter bars are completely executed over cut-over portions of the field so that no part of the crop is forced down or broken by the swinging movements of the cutter bars; also that both cutter bars are in their proper cutting positions, perpendicular to the line of travel, by the time these cutter bars again meet the crop in the forward movement of the tractor after a turn.

In making a left turn, the draft tongue 51 contacts against the stop 64 throughout the turn and the rear mower 12 turns as though the tongue 51 were rigidly secured thereon. The guide rod 86 does not function when turning to the left as the stop 97 is spaced a short distance from the end of the tubular rod 87 when the tongue 51 is in its extreme left hand position, that is against the stop 64. Two uniform swaths are simultaneously cut when turning to the left, the rear mower being at all times properly spaced relative to the front tractor mower due to the offset point of connection 81—82 of the draft tongue 51 in the rear of the tractor.

If the cutter bar 21 should encounter an obstruction in operation, it is freed to pivot rearwardly about the point 31. The rear mower 12 is spaced a sufficient distance behind the tractor so that the cutter bar 21 may swing freely between them. In any safety release of the rear mower at the hitch connection 82, the guide rod 89 merely slips out of the end of the tubular rod 87.

While I have shown the present hitch connection for operatively associating a mower to the right side of the tractor mower, it is obvious that this arrangement could be reversed so that the mower would be positioned on the left side of the tractor mower with the cutter bars of both implements extending to the left for cutting the crop from that side. It is also to be understood that the instant invention is not limited to be used with a tractor mower and separate mowing machine, but may be applied to any type of pulling vehicle and any type of working trailer and still be within the spirit of my invention and scope of the appended claims.

What I claim is:

1. The combination with a working implement adapted to be drawn in offset relation behind a pulling vehicle, of a hitch connection between said implement and vehicle comprising a draft member pivotally connected for lateral movement about a point on said implement, means for limiting the lateral swinging movement of said draft member, yielding means tending to hold said draft member against said limiting means to thereby position said member in normal operative position, and means for connecting said member to said pulling vehicle at a point offset laterally in the rear thereof.

2. The combination with a working implement adapted to be drawn in offset relation behind a pulling vehicle, of a hitch connection between said implement and vehicle including an automatically extensible guide member disposed between said implement and vehicle for positively steering said implement, said guide member being operative in one direction only to transmit a force to steer said implement when executing a turn.

3. The combination with a working implement adapted to be drawn in offset relation behind a pulling vehicle, of a hitch connection between said implement and vehicle including a guide member pivoted to said implement and at a point offset laterally in the rear of said vehicle, said guide member comprising telescopic sections freely movable longitudinally relative to each other, and means on one of said sections for limiting the longitudinal movement of said sections in one direction only to exert a force on said implement when executing a turn.

4. The combination with a wheeled implement adapted to be drawn in offset relation behind a tractor, of a hitch connection between said implement and tractor comprising a draft member connected to said implement and at a point in the rear of said tractor, and a guide means effective in compression only and connected with said implement at a point spaced from one side of said draft member and connected to said tractor at a point spaced from the opposite side of said draft member, said draft member acting under tension and bending stresses in a turning movement, said guide means being subjected to compression forces to supplement said draft member in a turning operation.

5. The combination with a wheeled implement adapted to be drawn in offset relation behind a tractor, of a hitch connection between said implement and tractor comprising a draft member pivoted for lateral movement on said implement and connected to said tractor and subjected to tension on forward draft of said implement, means on said implement for restraining the movement of said draft member in one direction to thereby exert bending stresses in said member in a turning operation, and a guide member pivoted on said implement at a point to one side of said draft member and connected to said tractor at a point on the opposite side of said draft member, said guide member comprising telescopic sections movable longitudinally between said implement and tractor, and means on said guide member for restraining the movement of said sections in one direction, said guide member subjected to compression in a turning operation responsive to tension and bending stresses in said draft member.

6. The combination with a wheeled implement adapted to be drawn in offset relation behind a tractor, of a hitch connection between said implement and tractor comprising a draft tongue pivotally connected for lateral movement about a point on said implement and connected to said tractor, a guide member disposed between said implement and tractor and comprising a longitudinally movable shaft, means for restraining said movement in one direction, spaced members on either side of said tongue for limiting the lateral movement thereof, one of said members abutting said tongue in a turning movement of the implement thereby effecting bending stresses on said tongue, said guide member adapted to move longitudinally a maximum extent responsive to said turning movement to exert a rearward force on said implement causing the latter to pivot in a direction opposite to movement of said tractor.

7. The combination with a wheeled implement adapted to be drawn in offset relation behind a tractor, of a hitch connection between said implement and tractor comprising a draft tongue pivotally connected for lateral movement about a point on said implement and connected to said tractor, stops mounted on either side of said tongue for limiting the lateral movement thereof, a guide member disposed for longitudinal movement between said implement and tractor, said tongue subjected to tension and bending stresses in a turning movement of said tractor thereby causing said guide member to move longitudinally to effect a force on said implement opposite to the force exerted by said tongue.

8. The combination with a working implement adapted to be drawn in offset relation behind a pulling vehicle, of a hitch connection for said implement comprising a rearwardly and laterally extending draft frame on said vehicle, a draft tongue connected to said frame and pivoted on said implement, a guide frame on said implement through which said draft tongue extends, eccentric stops on said frame positioned at either side of said tongue and adjustable to vary the position said tongue can assume relative to said implement in certain operative positions, a spring for normally urging said tongue against one of said stops, a lateral bracket on said draw frame, a guide member connected to said bracket at a point spaced laterally from one side of said tongue and connected on said implement at a point spaced laterally from the opposite side of said tongue, said guide member comprising telescopic sections movable longitudinally between said implement and tractor, a stop on one of said sections for limiting said longitudinal movement in one direction, whereby turning of said tractor in one direction will transmit tension and bending stresses through said tongue, said guide member being movable longitudinally responsive to said turning movement to transmit a rearward force on said implement thereby causing the latter to pivot oppositely to the turning of said tractor.

9. The combination with a mower adapted for connection with a tractor, of a hitch connection between said mower and tractor comprising a draft tongue pivotally connected with the mower, a releasable hitch connecting said tongue with said tractor, and means cooperating between the aforesaid implements for exerting a rearward thrust against the mower, said means comprising freely separable sections which are free to separate when the releasable hitch is released.

10. The combination with a pulling vehicle and a pulled vehicle, of draft means for said pulled vehicle including releasable hitch means for connecting said vehicle and releasable when said pulled vehicle strikes an obstruction, and releasable guide means for said pulled vehicle connected between the latter and said pulling vehicle and cooperating with said draft means to guide the movements of said pulled vehicle, said guide means being automatically disconnected when said hitch means is released.

TALBERT W. PAUL.